(12) United States Patent
Fillipo et al.

(10) Patent No.: US 9,403,997 B2
(45) Date of Patent: Aug. 2, 2016

(54) NON-VOC NEUTRALIZING AGENTS FOR COATINGS

(71) Applicant: Hercules Incorporated, Wilmington (DE)

(72) Inventors: Bruce K. Fillipo, Springfield, PA (US); Margaret K. Oplinger, Kennett Square, PA (US); Jeffrey K. Politis, Arden (DE)

(73) Assignee: HERCULES INCORPORATED, Wilmington, DE (US)

( * ) Notice: Subject to any disclaimer, the term of this patent is extended or adjusted under 35 U.S.C. 154(b) by 365 days.

(21) Appl. No.: 13/803,219

(22) Filed: Mar. 14, 2013

(65) Prior Publication Data

US 2013/0239851 A1 Sep. 19, 2013

Related U.S. Application Data

(60) Provisional application No. 61/611,407, filed on Mar. 15, 2012.

(51) Int. Cl.
| | |
|---|---|
| C09D 7/12 | (2006.01) |
| C08K 5/17 | (2006.01) |
| C08K 5/521 | (2006.01) |
| C08K 5/524 | (2006.01) |
| C08K 5/42 | (2006.01) |
| C08K 5/529 | (2006.01) |
| C08K 5/41 | (2006.01) |
| C09D 5/02 | (2006.01) |

(52) U.S. Cl.
CPC ............... *C09D 7/1233* (2013.01); *C08K 5/41* (2013.01); *C08K 5/42* (2013.01); *C08K 5/521* (2013.01); *C08K 5/524* (2013.01); *C08K 5/529* (2013.01); *C09D 5/024* (2013.01); *C08K 5/17* (2013.01); *C08K 5/175* (2013.01)

(58) Field of Classification Search
CPC ............. B01F 17/0042; B01F 17/0057; B01F 17/0064; C09D 7/1233; C09D 5/024; C08K 5/17; C08K 5/175; C08K 5/41; C08K 5/42; C08K 5/521; C08K 5/524; C08K 5/529
See application file for complete search history.

(56) References Cited

U.S. PATENT DOCUMENTS

| | | | |
|---|---|---|---|
| 2005/0020743 A1* | 1/2005 | Ruhlmann et al. ............ 524/284 |
| 2010/0186631 A1 | 7/2010 | Baum et al. | |
| 2011/0179973 A1 | 7/2011 | Van Hemelryck et al. | |

FOREIGN PATENT DOCUMENTS

| | | |
|---|---|---|
| FR | 2829708 | 3/2003 |
| WO | 02079332 | 10/2002 |
| WO | 2008150157 | 12/2008 |

OTHER PUBLICATIONS

International Search Report, PCT/US/2013/031186, May 16, 2013, pp. 1-2.

* cited by examiner

*Primary Examiner* — David M Brunsman
(74) *Attorney, Agent, or Firm* — Shaorong Chen

(57) ABSTRACT

Paint formulations are neutralized with a non-VOC neutralizing agent. The neutralizing agent is a neutralized amino acid or intermediate, an amino phosphate, an amino phosphonate, amino sulfate, or amino sulfonate wherein the neutralizing agent has a $pKa_2$ of at least 9. These neutralizing agents can be used to provide a paint formulation within a pH range of 8 to 10 and do not add any volatile organic compounds to the paint formulation.

9 Claims, 2 Drawing Sheets

NON-VOC NEUTRALIZING AGENTS FOR COATINGS

CROSS REFERENCE TO RELATED APPLICATIONS

The present application claims the benefit under 35 U.S.C. 119 (e) of U.S. Provisional Patent Application Ser. No. 61/611,407, filed Mar. 15, 2012, the entire content of which is hereby expressly incorporated herein by reference.

BACKGROUND OF THE INVENTION

1. Field of the Disclosed and Claimed Inventive Concepts

The presently disclosed and claimed inventive concept(s) relates to an aqueous paint composition. Specifically, the aqueous paint composition comprises a neutralizing agent in an amount effective to neutralize the aqueous paint with low or zero volatile organic compounds (VOC) without any odor.

2. Background and Applicable Aspects of the Presently Disclosed and Claimed Inventive Concept(s)

Water based coating compositions generally are based on combinations of materials to achieve application and end coating properties. Coating components include binders, pigments, extenders, polymers, surfactants, coalescents, neutralizing agents, water etc. Pigments (e.g. titanium dioxide) and extenders (e.g. clays and calcium carbonate) are granular solids incorporated into the coating formulation to contribute hiding, color, toughness, texture, and other properties. The binder is a film-forming latex polymer (e.g. acrylic, styrene acrylic, vinyl acrylic vinyl acetate etc). As a liquid coating is applied and dried on a surface, this film-forming binder polymer serves to form a film (e.g. a dried coat) which bonds to the surface and also binds together all the non-volatile components of the paint including particularly any pigments and extenders present. The binder polymer imparts adhesion, gloss and is critical to durability, flexibility and toughness. Rheological polymers, dispersants, surfactants, foam control agents and coalescents are used to optimize the manufacturing process, "in-can stability," application properties, surface wetting, ensure good flow and leveling etc. There are also a variety of other additives added to coating formulations, such as, foam control agents, stabilizers, emulsifiers, adhesion promoters, UV stabilizers and biocides.

Most paint formulations are basic. Neutralizing agents are typically added to the formulation to reach the desired pH, typically 8.5 to 9.5. Neutralizing agents that have mild odor, higher boiling points, and lower vapor pressure, i.e., less volatile, are preferred. It is preferable to use a neutralizing agent that does not add any volatile organic compounds (VOC) to the paint formulation. A commonly used neutralizing agent is 2-amino-2-methyl-1-propanol (AMP-95); however, AMP-95 has a noticeable odor and is a VOC. Ammonia is a potential non-VOC neutralizing agent, but it has a strong undesirable odor.

DETAILED DESCRIPTION

Figure 1:
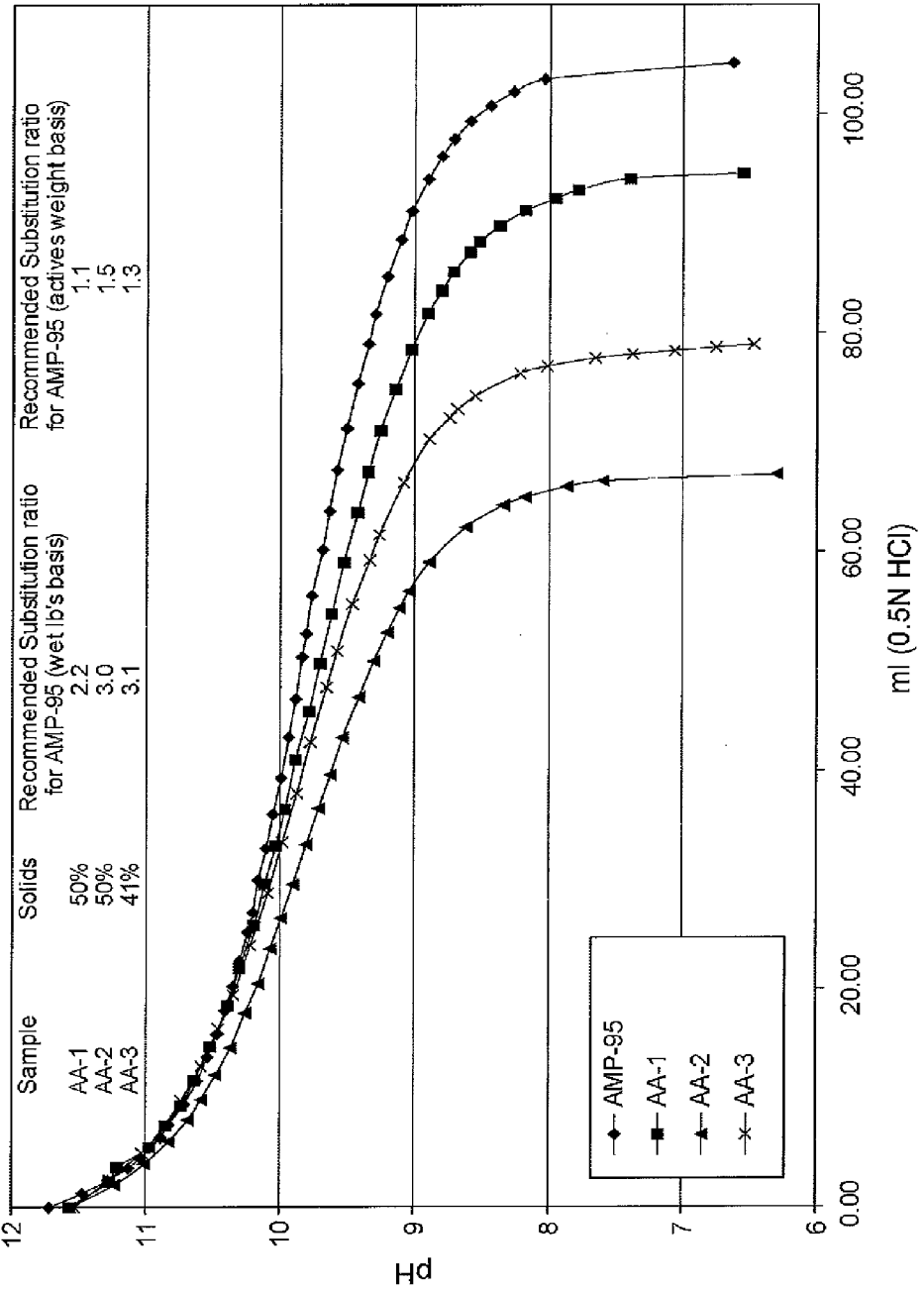
FIG. 1 is a neutralization curve of three neutralizing agents of the presently disclosed and claimed inventive concept(s) and a commercially available neutralizing agent.

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular. Generally, nomenclatures utilized in connection with, and techniques of chemistry described herein are those well known and commonly used in the art. Reactions and purification techniques are performed according to manufacturer's specifications or as commonly accomplished in the art or as described herein. The nomenclatures utilized in connection with, and the laboratory procedures and techniques of, analytical chemistry, synthetic organic chemistry, and medicinal and pharmaceutical chemistry described herein are those well known and commonly used in the art. Standard techniques are used for chemical syntheses, chemical analysis, pharmaceutical preparation, formulation, and delivery, and treatment of patients.

All patents, published patent applications, and non-patent publications mentioned in the specification are indicative of the level of skill of those skilled in the art to which this presently disclosed and claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, and/or the variation that exists among the study subjects. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

The presently disclosed and claimed inventive concept(s) is premised on the realization that certain neutralized zwitterions specifically certain neutralized amino acids and neutralized amino acid intermediates including phosphates, phosphonates, sulfates, and sultanates, can provide effective neutralizing agents for water based paints and coatings. These neutralizing agents have a very mild odor, a high boiling point and low vapor pressure, and are not volatile organic compounds. Suitable neutralizing agents have a $pKa_2$ of at least about 9.0.

According to the presently disclosed and claimed inventive concept(s), a neutralizing agent for water based coatings and paints is a neutralized zwitterions, specifically an amine having a $pKa_2$ of at least 9.0 wherein the amine is bonded to the alpha carbon adjacent a carboxylic acid group, a phosphate group, a phosphonate group, a sulfate group, or a sulfonate group. When the group is a carboxylic acid, the compound can be a neutralized amino acid.

The neutralizing agent can have a general following formula,

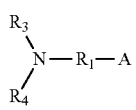

wherein A represents at least one of a neutralized carboxylic acid group, a phosphate group, a phosphonate group, a sulfate group, a sulfonate group, or combinations thereof. $R_1$ represents $C_1$-$C_6$ alkyl, $C_2$-$C_6$ alkenyl or aryl. $R_3$ and $R_4$ represent hydrogen, $C_1$-$C_6$ alkyl, $C_2$-$C_6$ alkenyl or aryl. $R_1$, $R_3$, or $R_4$ can be combined to form either a cyclic or heterocyclic group.

With the heterocyclic compound, the heterocyclic atom can be nitrogen, oxygen or sulfur. Further, the alkyl and alkenyl groups can be further substituted with, for example, but by no way of limitation, thionyl or carboxyl groups.

Alternately, the first alpha carbon can be bonded to a second alpha carbon adjacent to an amine and a carboxylic acid group (e.g., 2,6-diamino-heptanoate, a lysine intermediate) or a phosphate group, a phosphonite group, a sulfate group or a sulfonate group, as shown below,

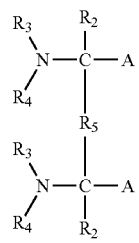

wherein A represents one of a neutralized carboxylic acid group, a phosphate group, a phosphonate group, a sulfate group, or a sulfonate group. $R_2$, $R_3$ and $R_4$ represent hydrogen, $C_1$-$C_6$ alkyl, $C_2$-$C_6$ alkenyl or aryl. $R_2$, $R_3$, or $R_4$ can be combined to form either a cyclic or heterocyclic group. $R_5$ represent a $C_1$-$C_6$ alkyl, $C_2$-$C_6$ alkenyl or aryl. With the heterocyclic compound, the heterocyclic atom can be nitrogen, oxygen or sulfur. Further, the alkyl and alkenyl groups can be further substituted with, for example, but by no way of limitation, thionyl or carboxyl groups.

To be effective, the neutralizing agent can have a $pKa_2$ of at least about 9.0. In one non-limiting embodiment, the neutralizing agent can have a $pKa_2$ of at least about 9.5. In another non-limiting embodiment, the neutralizing agent can have a $pKa_2$ of at least about 9.8 or higher. The pH of the concentrated neutralizing agent can be higher than $pKa_2$.

If the functional group is an un-neutralized amino acid, it can be neutralized with any typical base. Generally, sodium, potassium and calcium hydroxides are suitable for neutralization of these compounds. The neutralization can provide a counter ion for the anionic functional group, generally sodium, potassium and calcium. Generally, ammonium hydroxide would not be used due to potential odor concerns. Particularly suitable for use in the presently disclosed and claimed inventive concept(s) are the following neutralized amino acids listed in Table 1.

TABLE 1

| Amino Acid | $pKa_2$ |
| --- | --- |
| Glycine | 9.7 |
| Alanie | 9.9 |
| Isoleucine | 9.8 |
| Proline | 10.6 |
| Cysteine | 10.7 |
| Aspartate | 9.9 |

Of these, neutralized alanine, glycine, and aspartic acid are quite useful. Other suitable compositions can include, for example, but by no way of limitation, 2-aminoethyl hydrogen sulfate and O-phosphorylethanolamine.

Amino acids exist in either D or L forms. Naturally occurring amino acids are in the L forms. Accordingly, either D or L forms can be used but it is preferred the D form be used simply to reduce the potential for microbe growth.

The amino acids do not have to be fully neutralized as long as their pH is high enough to effectively lower the pH of the coating to the desired pH. Preferably, the amino acids are fully neutralized by stoichiometric addition of a strong base. Generally, the pH of the neutralized amino acid solution can be at least about 9.5 up to about 12. In one-non-limiting embodiment, the pH of the neutralized amino acid solution can be about 9.7 to about 11.0.

The neutralizing agents of the presently disclosed and claimed inventive concept(s) can be used in any aqueous paint formulation including acrylics, vinyl acrylics, vinyl acetate/ethylene, polyurethanes, polyesters, and aqueous based epoxies.

Generally, aqueous paint formulations can have a pH in the range of about 8.0 to about 10.0. Neutralizing agents that buffer at the upper end of this range can give the most reproducible pH adjustment, provide stability to the paint formulation and are preferred.

The neutralizing agent of the presently disclosed and claimed inventive concept(s) can be added to any component of the paint or added to the final paint formulation in an amount effective to establish the desired pH of the paint. The neutralizing agent can be combined with the grind to act as a co-dispersant. Generally, the paint formulation can include about 0.1 to about 1.0% by weight on an actives basis of the neutralizing agent.

To evaluate the quality of paints neutralized with neutralized amino acids, three paint formulations were prepared, as listed in Table 2. Formulation AA-1 utilized the sodium salt of glycine as a neutralizing agent. Formulation AA-2 included the neutralized glycine in combination with aspartate neutralized with caustic soda. Formulation AA-3 included alanine neutralized with caustic soda.

Figure 2:
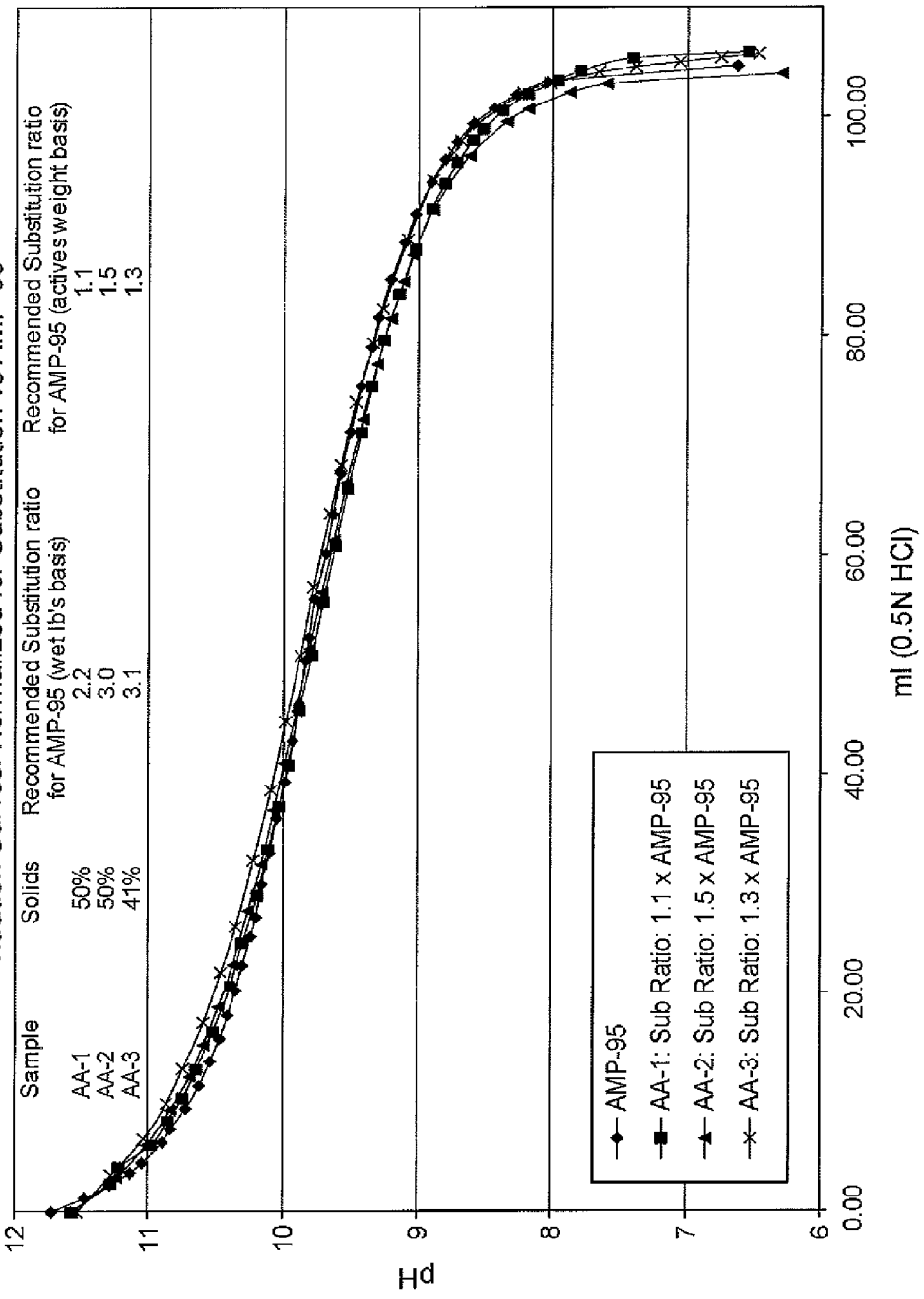
FIG. 2 is a graph showing neutralization curves of the four neutralizing agents shown in FIG. 1 on an equal molar basis.

The neutralization curves of the neutralizing agents listed in Table 2, along with the neutralization curve of AMP-95 (noted earlier common VOC neutralizing agent), are shown in FIG. 1. FIG. 2 shows the neutralization curves of the same neutralizing agent where the relative stochiometries are taken into consideration. These Figures show that the titration curves are extremely similar to AMP-95.

TABLE 2

| Solutions Prepared | AA-1 | AA-2 | AA-3 |
|---|---|---|---|
| Water | 50% | 39.8% | 36.0% |
| Caustic Soda (I) | — | 12.4% | 27.9% |
| Glycine, Sodium Salt | 50% | 20.0% | — |
| Alanine | — | — | 29.7% |
| K Aspartic•0.5H20 | — | 27.8% | — |
| TDA ethoxylated organophosphate | — | — | 6.4% |
| Total | 100% | 100% | 100% |
| Solids | 50.8% | 50.7% | 41.5% |

The neutralizing agents shown in Table 2 were further tested in a paint formulation 23PVC 50-VOC Vinyl Acrylic Semi-Gloss White, using a HASE thickener. Gloss measurements, as well as yellowing were compared to AMP-95. The results are shown below in Table 3.

TABLE 3

| Amine | Initial Add (gms) | KU (eq) | ICI (eq) | pH (eq) | Gloss 20 | Gloss 60 | Gloss 20 (2 wks) | Gloss 60 (2 wks) | Yellowness Δb |
|---|---|---|---|---|---|---|---|---|---|
| AMP-95 | 1.07 | 95.2 | 1.110 | 8.77 | 23.7 | 68.2 | 17.7 | 52.3 | Control |
| L-Alanine (neutralized w/NaOH) | 3.09 | 94.3 | 1.052 | 8.61 | 28.1 | 70.5 | 15.5 | 56.0 | 0.23 |
| Glycine (neutralized w/NaOH) | 2.7 | 94 | 1.023 | 9.7 | 28.1 | 71.5 | 21.5 | 66.0 | 0.41 |
| DL-Aspartic Acid Potassium Salt Hemihydrate (neutralized) | 6.18 | 90.8 | 1.046 | 8.54 | 33.4 | 74.2 | 24.7 | 68.0 | 0.14 |
| L-Alanine (neutralized w/NaOH)/and with anionic surfactant | 3.3/0.10 | 93.4 | 1.060 | 8.68 | 22.0 | 67.5 | 19.5 | 64.2 | 0.29 |

The gloss values are comparable or superior to AMP-95, and further yellowing is not an issue. The measured gloss of the formulation with neutralized alanine is decreased more than the coating formulation using AMP-95 with storage, but gloss is maintained by the addition of an anionic surfactant. The formulations shown in Table 2 were tested in 23PVC50-VOC vinyl acrylic (UCAR379G) white and tested for gloss and yellowness. The results are shown in Table 4.

TABLE 4

| Amine | pH | KU (eq) | ICI (eq) | Gloss 20 | Gloss 60 | Gloss 20 (2 wks) | Gloss 60 (2 wks) | Yellowness Δb |
|---|---|---|---|---|---|---|---|---|
| AMP-95 | 8.78 | 95.2 | 1.110 | 23.7 | 68.2 | 17.7 | 62.3 | Control |
| AA-1 | 9.55 | 94 | 1.023 | 28.1 | 71.5 | 21.5 | 66.0 | 0.41 |
| AA-2 | 8.62 | 90.8 | 1.046 | 33.4 | 74.2 | 24.7 | 68.0 | 0.14 |
| AA-3 | 8.77 | 93.4 | 1.060 | 22.0 | 67.5 | 19.5 | 64.2 | 0.29 |

The above examples and data demonstrate that the neutralizing agents of the presently disclosed and claimed inventive concept(s) are as effective as commercially available neutralizing agents in aqueous paint formulations and the Ku and ICI viscosities are similar to those of AMP-95. Further, these neutralizing agents do not contribute any volatile organic compounds to the paint formulation. The neutralizing agents are generally categorized as non-hazardous for shipping purposes. Finally, the neutralization curves show that these neutralizing agents buffer at the upper end of the critical pH range of about 8.5 to about 9.5, resulting in the most reproducible pH adjustment. Thus these agents are ideal for neutralization of paint.

It is, of course, not possible to describe every conceivable combination of the components or methodologies for purpose of describing the disclosed information, but one of ordinary skill in the art can recognize that many further combinations and permutations of the disclosed information are possible. Accordingly, the disclosed information is intended to embrace all such alternations, modifications and variations that fall within the spirit and scope of the appended claims.

What is claimed is:

1. An aqueous paint composition comprising an effective amount of neutralized isoleucine.

2. An aqueous paint composition comprising an effective amount of a neutralizing agent having the following general formula:

Formula wherein A represents at least one of a neutralized carboxylic acid group, a phosphate group, a phosphonate group, a sulfate group, and a sulfonate group; $R_1$ represents $C_1$-$C_6$ alkyl, or $C_2$-$C_6$ alkenyl or aryl; $R_3$ and $R_4$ represent hydrogen, $C_1$-$C_6$ alkyl, or $C_2$-$C_6$ alkenyl or aryl; and two of $R_1$, $R_3$ and $R_4$ are combined to form either a cyclic or a heterocyclic compound, wherein said neutralizing agent has a $pKa_2$ of greater than 9.

3. The composition of claim 2, wherein A is a neutralized carboxylic acid group.

4. The composition of claim 3, wherein said neutralizing agent is selected from the group consisting of neutralized glycine, neutralized alanine, and neutralized proline.

5. The composition of claim 4, wherein said neutralizing agent is dextralevatory.

6. The composition of claim 2, wherein said neutralizing agent is a non-VOC (ASTM d-6886) and does not contribute VOC to the finished water based paint.

7. The composition of claim 2, wherein said neutralizing agent is present in an amount from about 0.1-1.0 percent by weight on an actives basis of the neutralizing agent.

8. A method of neutralizing a paint formulation comprising adding to said paint formulation a composition having the following general formula:

Formula wherein A represents at least one of a neutralized carboxylic acid group, a phosphate group, a phosphonate group, a sulfate group, and a sulfonate group; $R_1$ represents $C_1$-$C_6$ alkyl, or $C_2$-$C_6$ alkenyl or aryl; $R_3$ and $R_4$ represent hydrogen, $C_1$-$C_6$ alkyl, or $C_2$-$C_6$ alkenyl or aryl; and two of $R_1$, $R_3$ and $R_4$ are combined to form either a cyclic or a heterocyclic compound, wherein said neutralizing agent has a $pKa_2$ of greater than 9.

9. The method of claim 8, wherein said paint formulation includes pigment particles, said neutralizing agent is added to said pigment particles, and said pigment particles are subsequently added to said paint formulation.

* * * * *